United States Patent [19]

Okuyama et al.

[11] Patent Number: 5,188,798
[45] Date of Patent: Feb. 23, 1993

[54] GRID FOR NUCLEAR FUEL ASSEMBLY

[75] Inventors: Shinobu Okuyama; Kojiro Wakana, both of Ibaraki, Japan

[73] Assignee: Mitsubishi Nuclear Fuel Co., Tokyo, Japan

[21] Appl. No.: 822,203

[22] Filed: Jan. 17, 1992

Related U.S. Application Data

[62] Division of Ser. No. 437,082, Nov. 16, 1989, Pat. No. 5,104,609.

[30] Foreign Application Priority Data

Nov. 16, 1988 [JP] Japan .................. 63-289498

[51] Int. Cl.$^5$ .................................... G21C 3/34
[52] U.S. Cl. .................................. 376/442; 376/449
[58] Field of Search ............... 376/442, 449, 446, 441, 376/261

[56] References Cited

U.S. PATENT DOCUMENTS

| | | | |
|---|---|---|---|
| 3,715,275 | 2/1973 | Krawiec | 376/442 |
| 3,769,159 | 10/1973 | Zinn et al. | 376/442 |
| 3,920,515 | 11/1975 | Ferrari et al. | 376/442 |
| 4,125,435 | 11/1978 | Jabsen | 376/442 |
| 4,297,170 | 10/1981 | Leclercq | 376/442 |
| 4,411,862 | 10/1983 | Leclercq et al. | 376/442 |
| 4,683,117 | 7/1987 | Carlson et al. | 376/446 |
| 4,711,436 | 12/1987 | Kobuck et al. | 376/261 |
| 4,760,637 | 8/1988 | Kerrey et al. | 376/261 |

FOREIGN PATENT DOCUMENTS

| | | |
|---|---|---|
| 0033263 | 8/1981 | European Pat. Off. |
| 63-2193 | 1/1988 | Japan |
| 63-2194 | 1/1988 | Japan |
| 63-5296 | 1/1988 | Japan |
| 63-6396 | 1/1988 | Japan |
| 2022310 | 12/1979 | United Kingdom |
| 2081961 | 2/1982 | United Kingdom |

Primary Examiner—Daniel D. Wasil
Attorney, Agent, or Firm—Oblon, Spivak, McClelland, Maier & Neustadt

[57] ABSTRACT

In a grid for the nuclear fuel assembly, a grid member with springs and a grid member with dimples of the grid are arranged face to face such that grid cells of the grid member with springs and the grid member with dimples communicate with each other. Fuel rods are inserted into the grid cells of the respective grid members while the springs and the dimples are shifted sufficiently relative to each other so as not to contact the fuel rods. Subsequently, the grid members are moved to align the respective grid cells whereby the fuel rods are clamped by contacting with the dimples and springs. The grid members are then connected to each other. The grid cells of the grid member with dimples includes a thimble cell, and the grid cells of the grid member with springs include a thimble cell in alignment with one another.

7 Claims, 8 Drawing Sheets

GRID FOR NUCLEAR FUEL ASSEMBLY

This is a division of application Ser. No. 07/437,082, filed on Nov. 16, 1989, now U.S. Pat. No. 5,104,609.

BACKGROUND OF THE INVENTION

1. Field of the Invention

The present invention relates to a nuclear fuel assembly grid which simplifies insertion of a plurality of fuel rods into a plurality of grid cells during the assembly of the nuclear fuel assembly.

2. Description of the Prior Art

Figure 24:
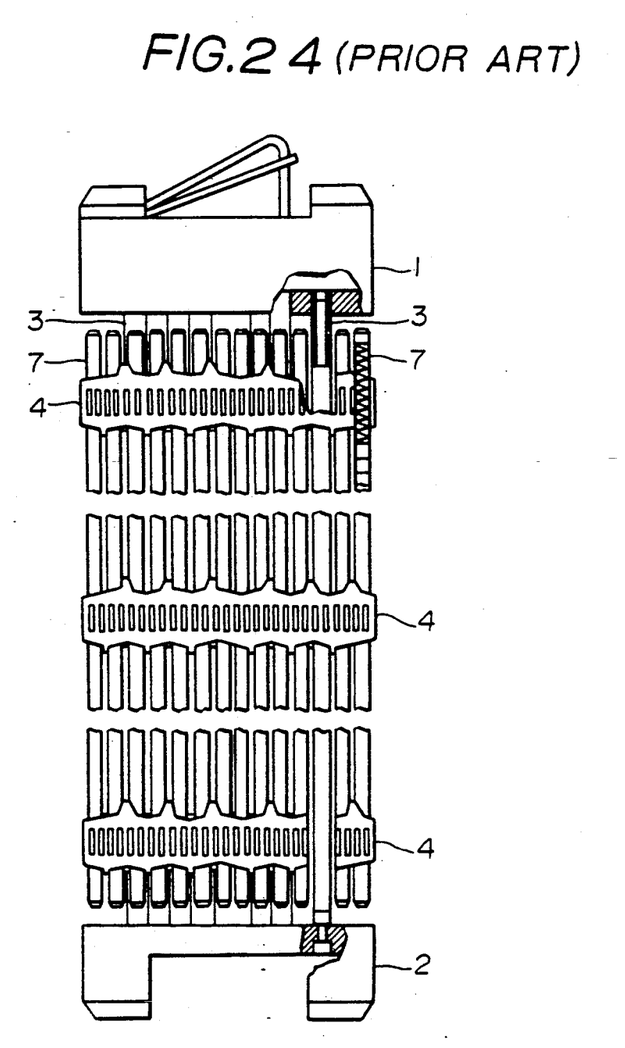
FIG. 24 is a side elevational view of a conventional nuclear fuel assembly.

A construction as shown in FIG. 24 of the attached drawings is known as an example of a nuclear fuel assembly which is mounted in a pressurized water reactor.

In FIG. 24, top and bottom nozzles 1 and 2 are vertically spaced and arranged in facing relation to each other. A plurality of control-rod guide thimbles 3 are fixed to and extend between the top and bottom nozzles 1 and 2. A plurality of grids 4 are mounted at intermediate portions of the respective control-rod guide thimbles 3 in a vertically spaced relation to each other.

Figure 25:
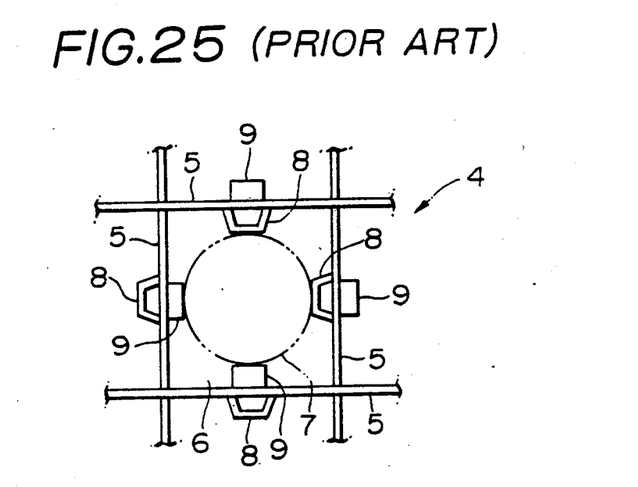
FIG. 25 is a schematic top plan view of one of the grid cells of the nuclear fuel assembly shown in FIG. 24.

As shown in FIG. 25, each of the grids 4 is formed such that a plurality of straps 5, each in the form of a thin plate, are assembled perpendicularly to each other into a grid by a mutual fitting of slits which are formed in the straps 5 in longitudinally equidistantly spaced relation to each other. A plurality of grid cells 6 are defined in each of the grids 4. A pair of dimples 8 and a pair of springs 9 for supporting a fuel rod 7 are mounted on the wall surface of each of the grid cells 6 in facing relation to each other. The fuel rod 7 inserted in the grid cell 6 is supported by being pushed against the dimples 8 by the springs 9.

An assembly method for the nuclear fuel assembly constructed above will next be described.

First, the grids 4 are arranged in a spaced relation to each other with a predetermined spacing. Then the control-rod guide thimbles 3 are inserted into and fixed to a part of the corresponding grid cells 6 of each of the grids 4. Subsequently, the fuel rods 7 are inserted into corresponding grid cells 6 in each of the grids 4 which are supported by the control-rod guide thimbles 3, with the fuel rod 7 in sliding contact with the dimples 8 and the springs 9. In this manner, the fuel rods 7 are held in fixed arrangement in the grid cells 6 by the dimples 8 and the springs 9. After insertion of all of the fuel rods 7, the top and bottom nozzles 1 and 2 are fixed to respective opposite ends of the control-rod guide thimbles 3.

A problem with the aforesaid assembling method of the nuclear fuel assembly is that when the fuel rods 7 are inserted into the respective grid cells 6 in the grids 4, the outer periphery of each of the fuel rods 7 is clamped between the dimples 8 and the springs 9, and insertion of the fuel rod 7 into the corresponding grid cells 6 is restricted by the resilient force of the springs 9. Thus, difficulties arise in the insertion operation detracting from the working or operating efficiency.

SUMMARY OF THE INVENTION

It is therefore an object of the invention to provide a grid for a nuclear fuel assembly, in which, when each of a plurality of fuel rods is inserted into a corresponding one of a plurality of grid cells, this can be done smoothly and easily, and after insertion of the fuel rod, the fuel rod is reliably supported.

To achieve these objects, according to the invention, there is provided an assembly method for a nuclear fuel assembly, comprising the steps of:

preparing at least a grid member first with springs, wherein the first springs are provided on wall sections of the grid member with springs, and at least second grid member with dimples, in which the dimples are provided on wall sections of the second grid member;

arranging the first grid member with springs and the second grid member with dimples face to face such that a plurality of grid cells of the first grid member with springs and a plurality of grid cells of the first grid member with dimples communicate with each other and that said dimples and said springs are disposed on planes which are opposed to each other;

inserting fuel rods respectively into the grid cells of the first grid member with springs and the second grid member with dimples, under such a condition that the springs and the dimples are shifted relative to each other in such a direction that the springs and the dimples move away from each other;

subsequently, moving at least one of said first grid member with springs and said second grid member with dimples such that the grid cells in the first grid member with springs and the grid cells in the grid member with dimples are in alignment with each other; and connecting the first grid member and the second grid member with dimples to each other.

According to the invention, there is also provided a grid for a nuclear fuel assembly, comprising:

a grid member with springs having a plurality of straps each in the form of a first thin plate, the straps intersecting each other to form a plurality of grid cells; and a grid member with dimples having a plurality of straps each in the form of a second thin plate, the straps of the grid member with dimples intersecting each other to form a plurality of first grid cells, that plane on which the dimples of the grid member with dimples are disposed being opposed to that plane on which the second springs of said grid member with springs are disposed;

the first grid member with springs and the second grid member with dimples being connected to each other such that the grid cells in the first grid member and the grid cells in the second grid member with dimples are in alignment with each other.

In the assembling method of the nuclear fuel assembly and the grid for the nuclear fuel assembly, the fuel rods are inserted respectively into the grid cells in such a condition that the grid member with springs and the grid members with dimples are shifted relative to each other. With such an arrangement, the difficulty of insertion of the fuel rods with the fuel rods in contact with the springs and the dimples is removed. Thus, it is possible to easily insert the fuel rods into the grid cells. Furthermore, after insertion of the fuel rods, the grid cells in the grid member with springs and the grid cells in the grid member with dimples are aligned with each other. Thus, it is possible to reliably support the fuel rods by the springs and the dimples.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
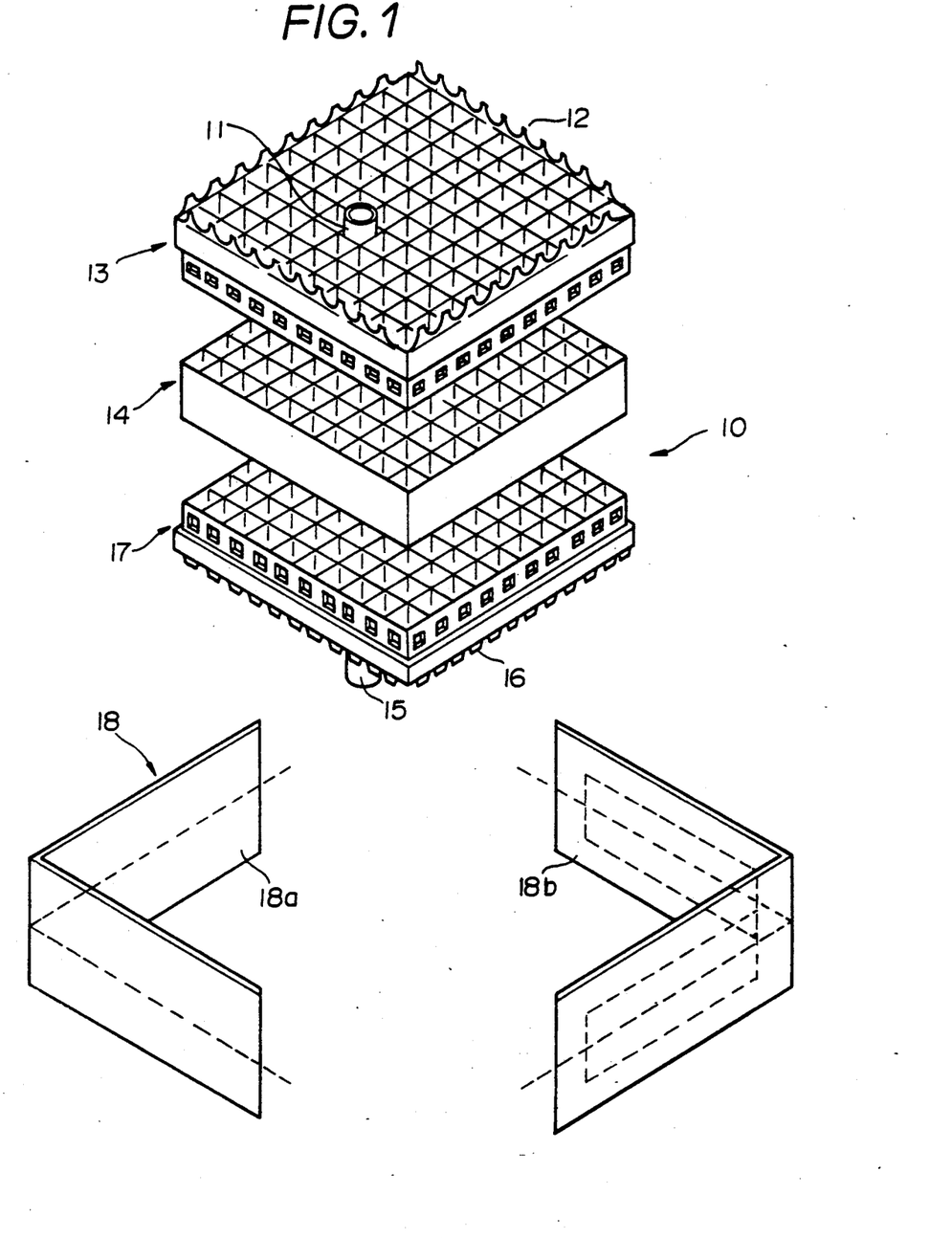
FIG. 1 is an exploded perspective view of a three division grid for a nuclear fuel assembly according to a first embodiment of the invention.

FIG. 1 is an exploded perspective view of a three division grid 10 being one of a plurality of grids for a nuclear fuel assembly according to a first embodiment of the invention. The grid 10 comprises a grid member 13 with dimples having sleeves 11 (only one shown) and vanes 12, a grid member 14 with springs, and a grid member 17 with dimples having sleeves 15 (only one shown) and tabs 16. The grid members 13, 14 and 17 are vertically superimposed on each other, and are fixedly connected to each other by an outer frame 18 which has a pair of frame members 18a and 18b.

Figure 2:
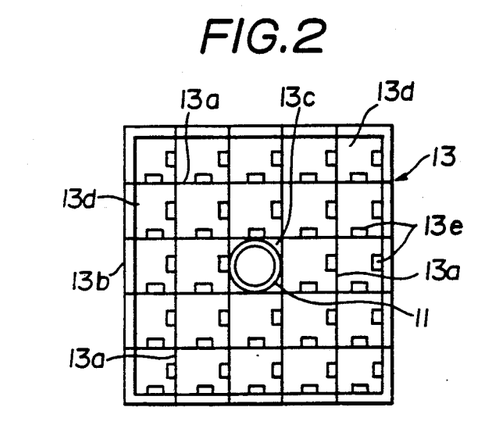
FIG. 2 is a top plan view of a grid member with dimples of the three division grid illustrated in FIG. 1.
Figure 3:
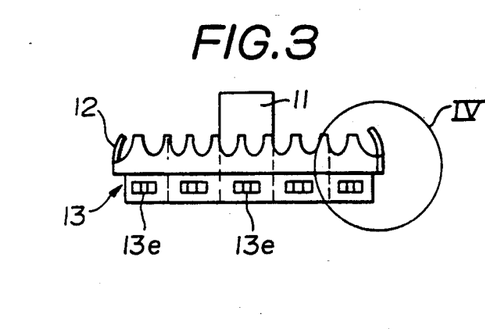
FIG. 3 is a side elevational view of the grid member shown in FIG. 2.

As shown in FIGS. 2 and 3, the grid member 13 with dimples is such that an outer strap 13b is mounted on four sides corresponding to the ends of a plurality of inner straps 13a which are assembled together into a grid form to define a plurality of grid cells 13d. Except for a thimble cell 13c to which the sleeve 11 is mounted, a pair of dimples 13e and 13e are provided respectively on two walls, i.e. the lower and right hand walls in FIG. 2, of each four wall section of the inner and outer straps 13a and 13b, which define one of the grid cells 13d. The pair of dimples 13e and 13e protrude toward the interior of the grid cell 13d.

Figure 4:
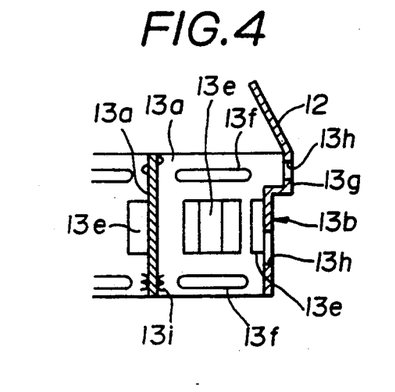
FIG. 4 is an enlarged schematic cross-sectional view of the inside of an encircled portion indicated by number IV in FIG. 3.

As illustrated in FIG. 4, a pair of corrugations 13f and 13f are formed respectively in the portions above and below each of the dimples 13e. Corrugations 13f are also formed in the thimble cell 13c. A shoulder 13g is formed on an upper portion of the outer strap 13b such that the shoulder 13g protrudes outwardly. The shoulder 13g may be tapered in configuration. The aforementioned vanes 12 are formed on an upper portion of the shoulder 13g. The outer strap 13b is provided with a plurality of fitting holes 13h into which side tabs formed on longitudinal ends of the respective inner straps 13a are inserted. Furthermore, reference numeral 13i in FIG. 4 denotes a pimple.

Figure 11:
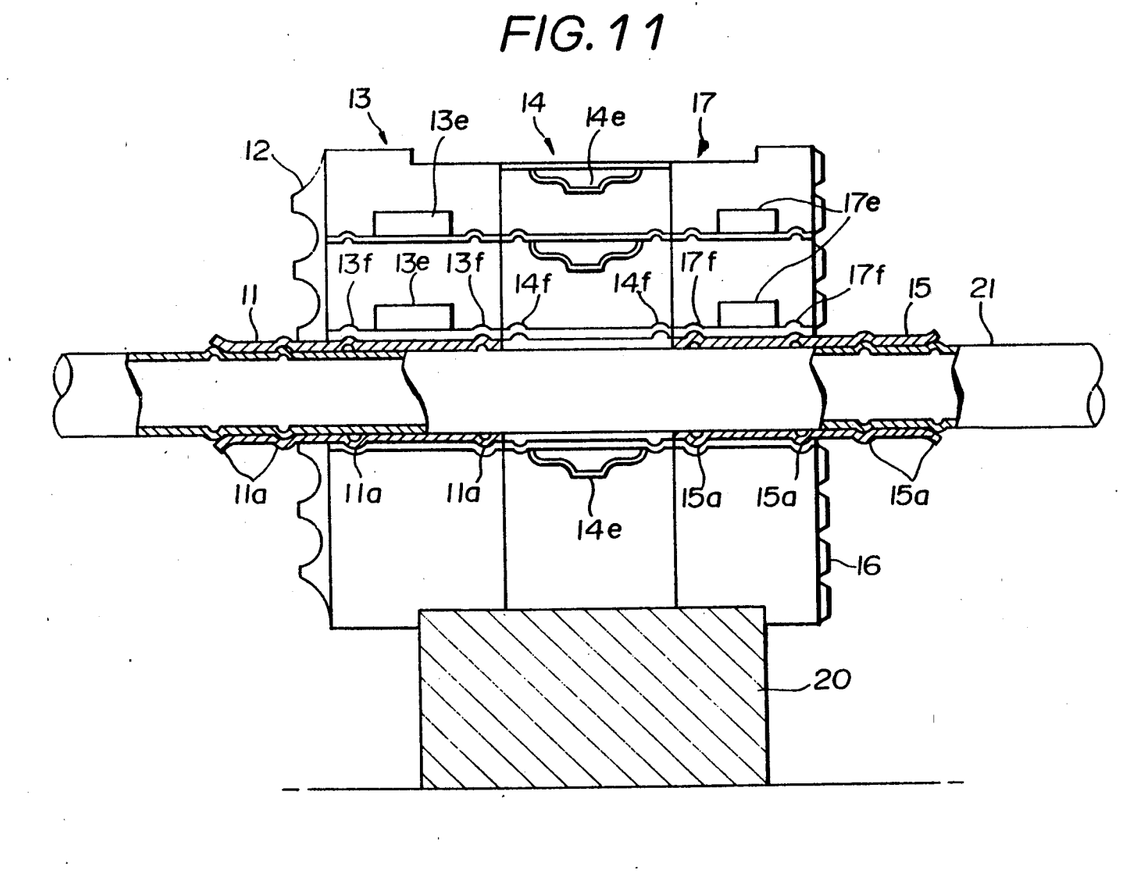
FIG. 11 is a skeleton view of an assembly step of the nuclear fuel assembly shown in FIG. 1.

As shown in FIG. 11, the sleeve 11 is provided with a plurality of bulges 11a at respective positions corresponding to the corrugations 13f of the thimble cell 13c. The bulges 11a are fitted respectively into the corrugations 13f.

Figure 5:
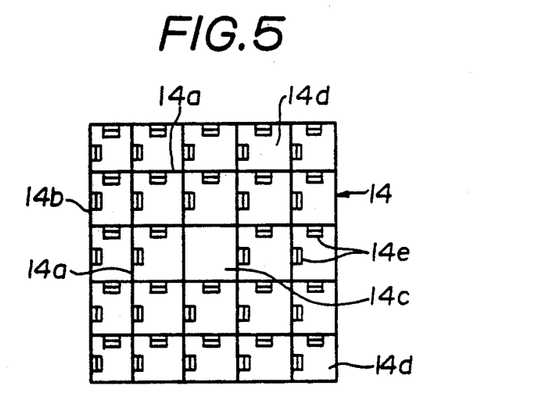
FIG. 5 is a top plan view of a grid member with springs of the three division grid illustrated in FIG. 1.
Figure 6:
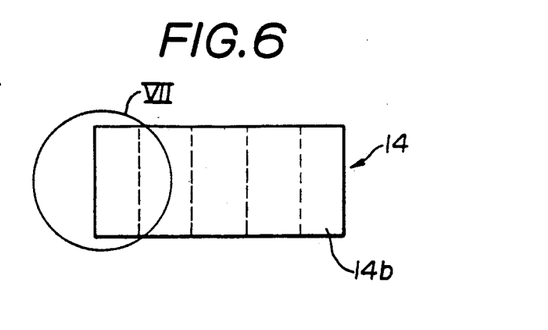
FIG. 6 is a side elevational view of the grid member shown in FIG. 5.

As illustrated in FIGS. 5 and 6, the grid member 14 with springs is such that an outer strap 14b is mounted on four sides corresponding to the ends of a plurality of inner straps 14a which are assembled together into a grid form to define a plurality of grid cells 14d. Except for a thimble cell 14c, a pair of springs 14e and 14e are provided respectively on two walls, upper and left-hand walls in FIG. 5, of each four wall section of the inner and outer straps 14a and 14b, which define one of the grid cells 14d. The pair of springs 14e and 14e protrude toward the interior of the grid cell 14d.

Figure 7:
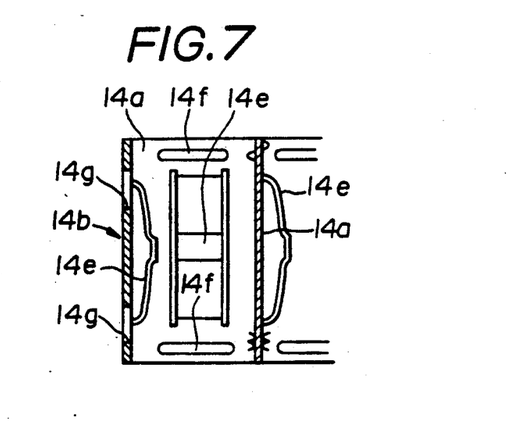
FIG. 7 is an enlarged schematic cross-sectional view of the inside of an encircled portion indicated by number VII in FIG. 6.

As shown in FIG. 7, a pair of corrugations 14f and 14f are formed respectively in the portions above and below each of the springs 14e, but these corrugations 14f and 14f may be dispensed with. The outer strap 14b is provided with a plurality of fitting holes 14g into which side tabs formed on longitudinal ends of the respective inner straps 14a are inserted.

Figure 8:
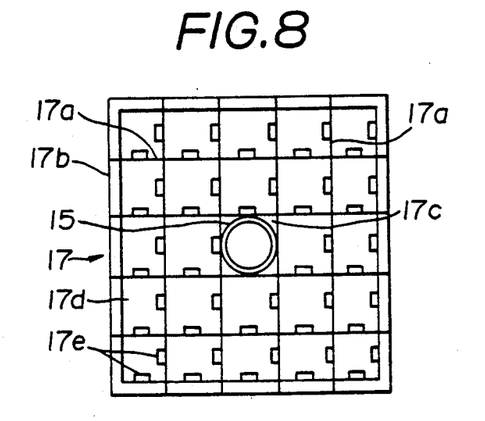
FIG. 8 is a top plan view of the other grid member with dimples of the three division grid illustrated in FIG. 1.
Figure 9:
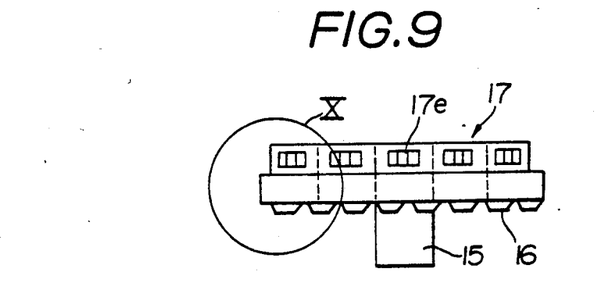
FIG. 9 is a side elevational view of the grid member shown in FIG. 8.

As illustrated in FIGS. 8 and 9, the grid member 17 with dimples is constructed as if the grid member 13 with dimples were inverted. The grid member 17 is such that an outer strap 17b is mounted on four sides corresponding to the ends of a plurality of inner straps 17a which are assembled together into a grid form to define a plurality of grid cells 17d. Except for a thimble cell 17c in which the sleeve 15 is mounted, a pair of dimples 17e and 17e are provided respectively on two walls, lower and right-hand walls in FIG. 8, of each four wall section of the inner and outer straps 17a and 17b, which define one of the grid cells 17d. The pair of dimples 17e and 17e protrude toward the interior of the grid cell 17d.

Figure 10:
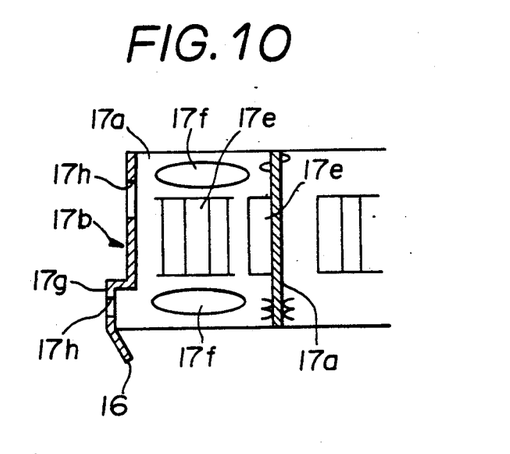
FIG. 10 is an enlarged schematic cross-sectional view of the inside of an encircled portion indicated by number X in FIG. 9.

As shown in FIG. 10, a pair of corrugations 17f and 17f are formed respectively in the portions above and below each of the dimples 17e. Corrugations 17f are also formed in the thimble cell 17c. A shoulder 17g is formed on a lower portion of the outer strap 17b such that the shoulder 17g protrudes outwardly. The shoulder 17g may be tapered in configuration. The aforementioned tabs 16 are formed on a lower portion of the shoulder 17g. The outer strap 17b is provided with a plurality of fitting holes 17h into which side tabs formed on longitudinal ends of the respective inner straps 17a are inserted.

As illustrated in FIG. 11, the sleeve 15 is provided with a plurality of bulges 15a at respective positions corresponding to the corrugations 17f of the thimble cell 17c. The bulges 15a are fitted respectively into the corrugations 17f.

Each of the three grid members 13, 14 and 17 as described above is assembled by fixedly securing the inner straps 13a, 14a or 17a to each other and to the outer straps 13b, 14b or 17b, and fixedly securing the inner straps 13a and 17a to the sleeves 11 and 15, by welding or brazing.

Subsequently, as shown in FIG. 11, the three grid members 13, 14 and 17 thus assembled are received side by side on one of grid retainers 20 of a skeleton assembly jig. At this time, the grid members 13, 14 and 17 are arranged in facing relation and held in the positions illustrated respectively in FIGS. 2, 5 and 8. That is, the orientation of the dimples 13e and 17e of the respective grid members 13 and 17 is arranged to coincide, and the orientation of the springs 14e of the grid members 14 is arranged to be paralleled to and face the orientation of the dimples 13e and 17e. Then, a guide thimble 21 is inserted through the thimble cells 13c, 14c and 17c of the respective grid members 13, 14 and 17, while maintaining slight gaps or clearances between the respective grid members 13, 14 and 17. The guide thimble 21 and the sleeves 11 and 15 of the respective grid members 13 and 17 are bulge-fixed to each other.

Figure 12:
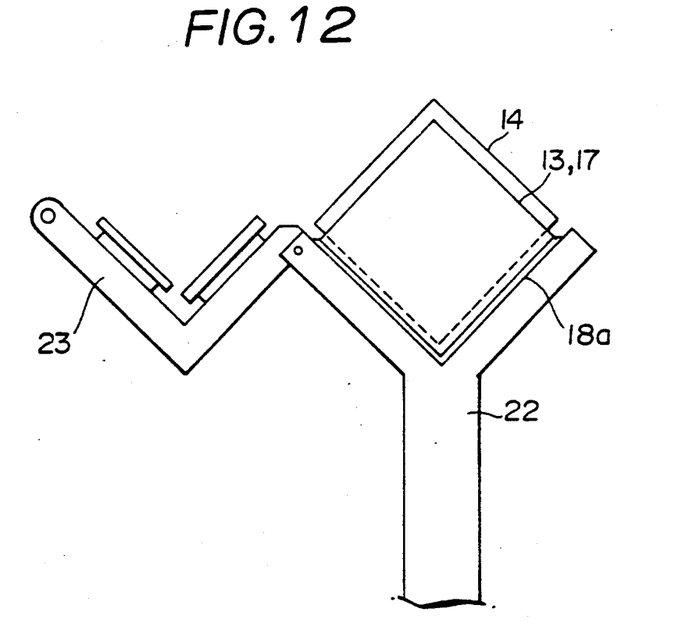
FIG. 12 is a view of another assembly step of the nuclear fuel assembly illustrated in FIG. 1.
Figure 13:
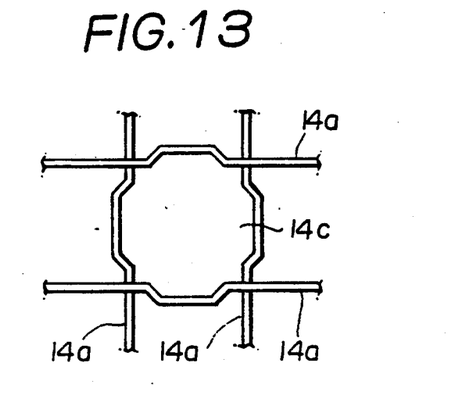
FIG. 13 is a schematic view of a thimble cell of a grid member with springs according to a modification of the invention.
Figure 14:
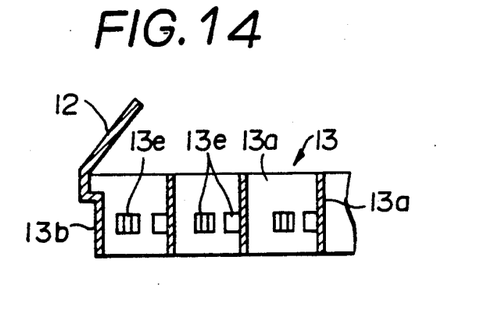
FIG. 14 is a schematic longitudinal cross-sectional view of a grid member with dimples of a four division grid for a nuclear fuel assembly according to a second embodiment of the invention.
Figure 15:
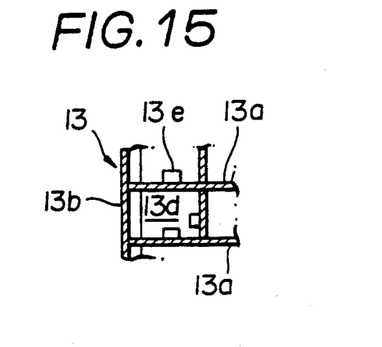
FIG. 15 is a schematic transverse cross-sectional view of the grid member illustrated in FIG. 14.
Figure 16:
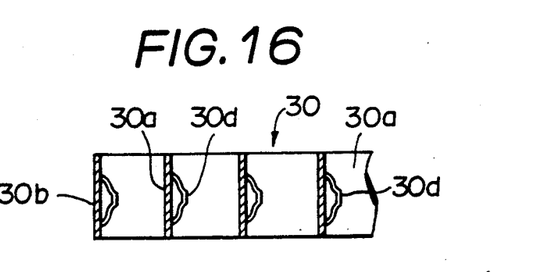
FIG. 16 is a schematic longitudinal cross-sectional view of a grid member with springs according to the second embodiment of the invention.

In this manner, the three grid members 13, 14 and 17 are assembled into the skeleton assembly. Subsequently, as shown in FIG. 12, one frame member 18a of the outer frame 18 is first mounted on a Y-shaped support 22 of an assembling jig, and the skeleton assembly is then mounted on the Y-shaped support 22. In this case, the grid members 13 and 17 of the skeleton assembly are fixed to each other by swinging of an L-shaped grid fixing arm 23 toward the support 22, and the grid member 14 is moved upwards by 1 mm to 2 mm. Since there is no sleeve mounted in the thimble cell 14c of the grid member 14, the grid member 14 can move by the clearance amount between the guide thimble 21 and the thimble cell 14c, that is, by twice the wall thickness of the sleeve. Moreover, as shown in FIG. 13, the wall sections of the inner straps 14a, which form the thimble cell 14c, may be deformed outwardly, in order to obtain a sufficient amount of upward movement of the grid member 14.

In the condition shown in FIG. 12, fuel rods are all inserted into the grid cells 13d, 14d and 17d of the skeleton assembly. Subsequently, the grid member 14 is moved downwards, and the other frame member 18b of the outer frame 18 is mounted on the skeleton assembly and is fixedly welded to the frame member 18a. In insertion of the fuel rods, it is possible to smoothly insert the fuel rods in the grid cells 13d, 14d and 17d, because the dimples 13e and 17e are spaced sufficiently apart from the springs 14e, so that no scratches occur on the fuel rods. Further, since the grid members 13, 14 and 17 are fixedly connected to each other by the outer frame 18, the straps 13b, 14b and 17b are so reinforced that the earthquake-resistant strength of the grid members 13, 14 and 17 is increased.

In connection with the above, as indicated by the broken lines in FIG. 1, each of the frame members 18a and 18b of the outer frame 18 may be divided into two sections. In this case, the grid members 13 and 14 are fixedly connected to each other by the upper two sections of the respective frame members 18a and 18b, and the grid members 14 and 17 are fixedly connected to each other by the lower two sections of the respective frame members 18a and 18b. Further, perforations may be formed in the outer frame 18 to lighten the latter. Alternatively, holes for side tabs may be formed in the outer frame 18 to take the side tabs of the respective inner straps 13a, 14a and 17a protruding through the outer straps 13b, 14b and 17b to the outer frame 18, so that the respective inner straps 13a, 14a and 17a are fixed to the outer frame 18 by the respective side tabs. Furthermore, the vanes 12 and the tabs 16 formed on the respective outer straps 13b and 17b may be formed on the outer frame 18.

A second embodiment of the present invention will be described with reference to FIGS. 14 through 23, which show one of a plurality of four division grids. In the second embodiment, a pair of two division spring grid members 30 and 31 are used in substitution for the spring grid member 14 of the first embodiment. Other construction of the second embodiment is substantially the same as that of the first embodiment. Accordingly, components and parts similar to those of the first embodiment are designated by the same reference numerals, and description of the similar components and parts will be omitted for simplification.

Figure 17:
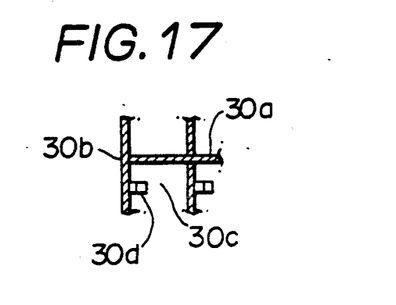
FIG. 17 is a schematic transverse cross-sectional view of the grid member shown in FIG. 16.
Figure 18:
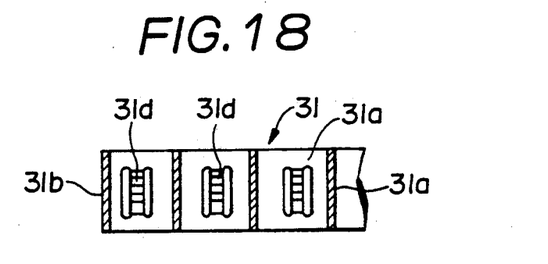
FIG. 18 is a schematic longitudinal cross-sectional view of the other grid member with springs according to the second embodiment of the invention.
Figure 19:
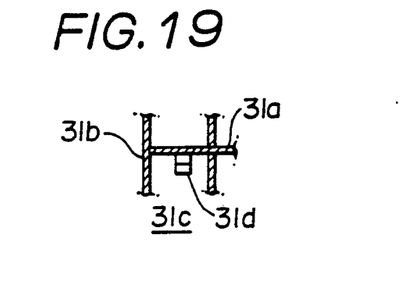
FIG. 19 is a schematic transverse cross-sectional view of the grid member shown in FIG. 18.
Figure 20:
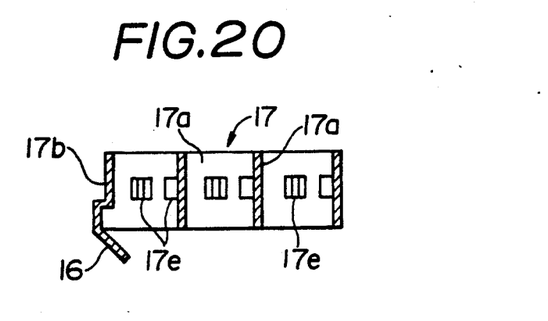
FIG. 20 is a schematic longitudinal cross-sectional view of the other grid member with dimples according to the second embodiment of the invention.
Figure 21:
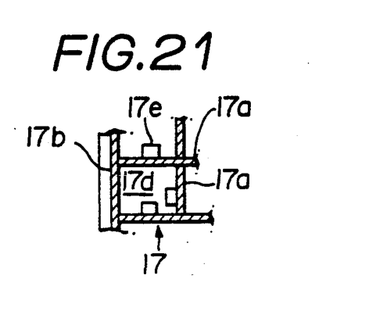
FIG. 21 is a schematic transverse cross-sectional view of the grid member shown in FIG. 20.

As shown in FIGS. 16 through 19, each of the grid members 30 and 31 with springs has an outer strap 30b or 31b mounted to four sides corresponding to the ends of a plurality of inner straps 30a or 31a which are assembled together into a grid form to define a plurality of grid cells 30c or 31c. As shown in FIG. 17, except for a thimble cell, a spring 30d is provided on a left-hand wall of each four wall section formed by the inner straps 30a or the inner and outer straps 30a and 30b in the grid member 30. The four wall sections define one of the grid cells 30c. The spring 30d protrudes toward the interior of the grid cell 30c. Likewise, as shown in FIG. 19, except for a thimble cell, a spring 31d is provided on an upper wall of each four wall section formed by the inner straps 31a or the inner and outer straps 31a and 31b in the grid member 31. The four wall sections define one of the grid cells 31c. The spring 31d protrudes toward the interior of the grid cell 31c.

As with the aforesaid first embodiment, during assembly into a skeleton assembly, the four division grid constructed as above is retained by one of the grid retainers 20 of the skeleton assembling jig. In this case, the grid members 13, 30, 31 and 17 are arranged face to face while being maintained at the relative positions illustrated respectively in FIGS. 15, 17, 19 and 21. Then, the guide thimble 21 is inserted into the thimble cells of the respective grid members 13, 30, 31 and 17, with a slight gap being retained between the respective grid members 13, 30, 31 and 17. The guide thimble 21 and the sleeves 11 and 15 of the respective grid members 13 and 17 are bulge-fixed to each other.

Figure 22:
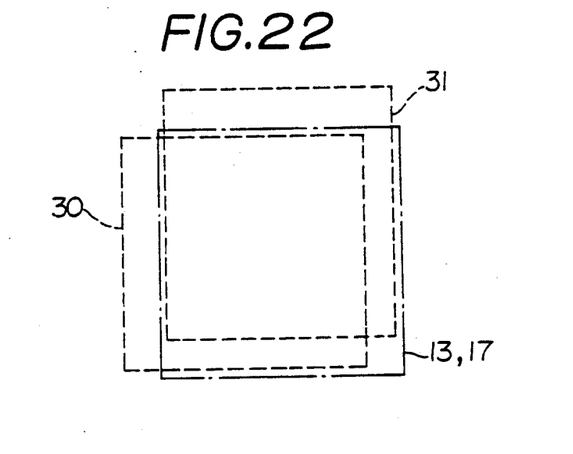
FIG. 22 is a view of positions of the respective grid members upon insertion of fuel rods according to the second embodiment of the invention.
Figure 23:
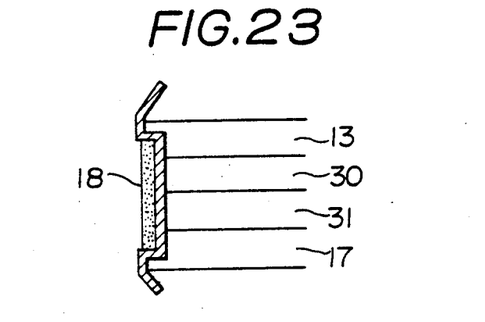
FIG. 23 is a cross-sectional view of the grid illustrated in FIGS. 14 through 21, after insertion of the fuel rods.

Subsequently, the four grid members 13, 30, 31 and 17 are assembled into the skeleton assembly. As shown in FIG. 23, one part of the outer frame 18 is first mounted on the Y-shaped support 22 of the assembling jig, and the skeleton assembly is then mounted on the Y-shaped support 22. The grid members 13 and 17 of the skeleton assembly are fixed to each other by swinging of the grid fixing arm 23 toward the support 22, so that the grid members 30 and 31 are moved upwards by 1 mm to 2 mm such that the springs 30d and 31d are moved away from the dimples 13e and 17e, as shown in FIG. 22. In this condition, the fuel rods are all inserted into the grid cells. The grid members 30 and 31 are then moved to align with the grid members 13 and 17. Subsequently, the other part of the outer frame 18 is mounted on the skeleton assembly, and are fixedly welded to the one part.

As described above, the assembly method of the nuclear fuel assembly according to the invention is constructed as follows. That is, the grid member with springs, wherein the springs are formed in the wall sections, and the grid member with dimples, wherein the dimples are formed in the wall sections, are arranged such that the grid cells in the respective grid members communicate with each other. The fuel rods are inserted into the grid cells under the condition that the grid member with springs and the grid member with dimples are shifted relative to each other in such a direction that the springs and the dimples are moved away from each other. Subsequently, the grid member with springs and the grid member with dimples are moved so that the grid cells in the respective grid members align with each other. The grid member with springs and the grid member with dimples are then connected to each other. With such arrangement, the fuel rods are inserted into the grid cells under the condition that the grid member with springs and the grid member with dimples are shifted relative to each other, and accordingly, at the time of insertion of the fuel rods, the difficulty arising from the fuel rods being in contact with the springs and the dimples is avoided. Thus, it is possible to easily insert the fuel rods into the grid cells, and it is possible to prevent scratches from occurring on the outer surfaces of the respective fuel rods.

Moreover, since the grid member with springs and the grid member with dimples are connected to each other such that their grid cells align with each other, it is possible to reliably support the fuel rods by the springs and the dimples, and to improve the strength of the outer straps.

Obviously, numerous modifications and variations of the present invention are possible in light of the above teachings. It is therefore to be understood that within the scope of the appended claims, the invention may be practiced otherwise than as specifically described herein.

What is claimed is:

1. A grid for a nuclear fuel assembly, comprising:
at least one grid member with springs having a plurality of straps each in the form of a thin plate, said straps intersecting each other to form a plurality of grid cells and at least two grid members with dimples having a plurality of straps each in the form of a thin plate, said straps of the grid members with dimples intersecting each other to form a plurality of grid cells, the grid cells of said grid members with dimples including a thimble cell, said grid member with springs and said grid members with dimples being alternately arranged in such a manner that a plane on which the dimples of said grid members with dimples are disposed is positioned so as to be parallel to and opposed to a plane on which the springs of said grid member with springs are disposed, and that the grid cells in said grid member with springs and the grid cells in said grid members with dimples are in alignment with each other; and a sleeve mounted on one of said at least one grid member with springs and said grid members with dimples, and a guide thimble fixed to said sleeve, whereby said grid member with springs and said grid members with dimples are shiftable relative to each other in a lateral direction.

2. A grid according to claim 1, wherein the grid member with springs and said grid members with dimples are arranged such that the three grid members are superimposed on each other with the grid member with springs being interposed between the pair of grid members with dimples, and which comprises an outer frame by which the superimposed three grid members are connected to each other.

3. A grid according to claim 2, wherein the straps of each of said three grid members include an outer strap and a plurality of inner straps, said outer strap being mounted to four sides corresponding to the ends of said inner straps which are assembled together into a grid form to define the grid cells, each of said grid members with dimples having a plurality of pairs of dimples, each pair of dimples being provided respectively on adjacent two of four wall sections of the inner and outer straps of the grid member with dimples, said four wall sections defining one of the grid cells of the grid members with dimples, said grid member with springs having a plurality of pairs of springs, each of said pair of springs being provided respectively on adjacent two of four wall sections of the inner and outer straps of the grid member with springs.

4. A grid according to claim 2, wherein said outer frame has a pair of frame members, and each of said frame members of said outer frame is divided into two sections.

5. A grid for a nuclear fuel assembly, comprising:
a grid member with springs having a plurality of straps each in the form of a thin plate, said straps intersecting each other to form a plurality of grid cells; and
a grid member with dimples having a plurality of straps each in the form of a thin plate, said straps of the grid member with dimples intersecting each other to form a plurality of grid cells, wherein a plane on which the dimples of said grid member with dimples are disposed is positioned so as to be opposite a parallel plane on which the springs of said grid member with springs are disposed;

said grid member with springs and said grid member with dimples being connected to each other such that the grid cells in the grid member with springs and the grid cells in the grill member with dimples are in alignment with each other wherein the grid cells of said grid member with dimples includes a thimble cell, and the grid cells of said grid member with springs include a thimble cell, and wherein the thimble cell of each of the grid members with dimples and the grid member with springs has four wall sections which are deformed outwardly.

6. A grid for a nuclear fuel assembly, comprising:

at least one grid member with springs having a plurality of straps each in the form of a thin plate, said straps intersecting each other to form a plurality of grid cells; and at least one grid member with dimples having a plurality of straps each in the form of a thin plate, said straps of the grid member with dimples intersecting each other to form a plurality of grid cells, wherein a plane on which the dimples of said grid member with dimples are disposed is positioned so as to be opposite a parallel plane on which the springs of said grid member with springs are disposed;

said grid member with springs and said grid member with dimples being connected to each other such that the grid cells in the grid member with springs and the grid cells in the grill member with dimples are in alignment with each other wherein said at least one grid member with springs comprises a pair of grid members with dimples and said at least one grid member with dimples comprises a pair of grid members with springs, and wherein the pair of grid members with springs and the pair of grid members with dimples are arranged such that the four grid members are superimposed on each other with the pair of grid members with springs interposed between the pair of grid members with dimples, and an outer frame by which the superimposed four grid members are connected to each other.

7. A grid according to claim 6, wherein the straps of each of said four grid members include an outer strap and a plurality of inner straps, said outer strap being mounted to four sides corresponding to the ends of said inner straps which are assembled together into a grid form to define the grid cells, each of said grid members with dimples having a plurality of pairs of dimples each pair provided respectively on adjacent two of four wall sections of the inner and outer straps of the grid member with dimples, said four wall sections defining one of the grid cells of the grid member with dimples, each of said pair of grid members with springs having a plurality of springs each provided on one of four wall sections of the inner and outer straps of the grid member with springs, said four wall sections defining one of the grid cells of the grid member with springs.

* * * * *